(12) United States Patent
Gehlsen

(10) Patent No.: US 6,231,278 B1
(45) Date of Patent: *May 15, 2001

(54) DIFFERENTIAL POSITIVE FEED MECHANISM

(75) Inventor: Paul R. Gehlsen, Bothell, WA (US)

(73) Assignee: The Boeing Company, Seattle, WA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/024,812

(22) Filed: Feb. 17, 1998

(51) Int. Cl.$^7$ .............................. B23B 35/00; B23B 47/18

(52) U.S. Cl. ..................... 408/1 R; 408/101; 408/137; 408/138; 408/141

(58) Field of Search ...................................... 408/1 R, 101, 408/137, 138, 141, 124, 129, 132, 241 R; 173/141; 74/22 R, 89.15

(56) References Cited

U.S. PATENT DOCUMENTS

| | | |
|---|---|---|
| 165,539 | 7/1875 | Bullock . |
| 246,938 | 9/1881 | Bullock . |
| 467,937 | 2/1892 | Kavanagh et al. . |
| 780,799 | 1/1905 | Kabaker . |
| 885,945 | 4/1908 | Moore . |
| 2,683,375 | 7/1954 | Gerentes . |
| 2,784,616 | 3/1957 | Quackenbush . |
| 3,039,330 * | 6/1962 | Aspeek ................... 408/92 |
| 3,449,971 * | 6/1969 | Posh ...................... 74/89.15 |
| 3,838,934 * | 10/1974 | Petroff .................. 408/137 |
| 4,050,835 * | 9/1977 | Womack ............... 408/137 |
| 4,115,025 * | 9/1978 | Petroff .................. 408/137 |
| 4,182,588 * | 1/1980 | Burkhart et al. ..... 408/137 |
| 4,911,588 * | 3/1990 | Ikemoto et al. ...... 408/137 |
| 5,351,797 * | 10/1994 | Lawson et al. ....... 408/137 |

* cited by examiner

Primary Examiner—Daniel W. Howell
(74) Attorney, Agent, or Firm—Conrad O. Gardner

(57) ABSTRACT

A differential positive feed mechanism that is coupled in-line or axially with a drill, reamer or cutter for use in limited access areas and feeds the tool into a workpiece when driven by an external rotary power source.

1 Claim, 3 Drawing Sheets

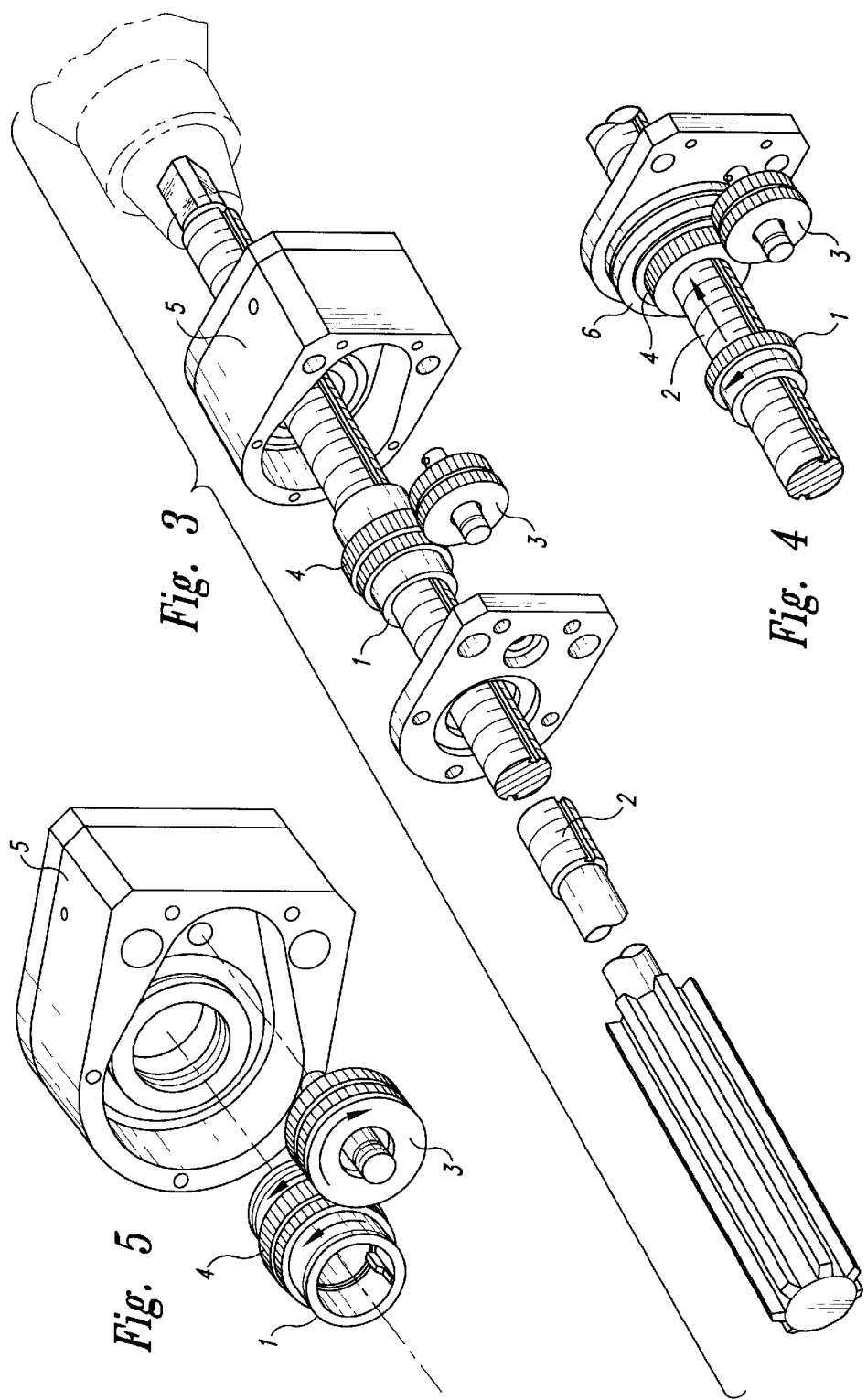

DIFFERENTIAL POSITIVE FEED MECHANISM

BACKGROUND OF THE INVENTION

1. Field of the Invention

The present invention relates to portable power feed tools and, more particularly, to portable power feed tools used in limited access areas.

2. Description of the Prior Art

Present power feed reaming and boring operations require special equipment that is dedicated to a specific job. This equipment is bulky and requires substantial space around the area to be worked. Also, special tooling must be employed to locate power feed motors and to react to the thrust force encountered during machining. Power feed motors come set up with a given RPM and a fixed feed rate. This can be very undesirable if the operator does not have the correct combination. Only a qualified technician can change this.

The patent literature includes:

U.S. Pat. No. 885,945 which discloses a drilling machine with a differential feed mechanism.

U.S. Pat. No. 467,937 discloses a stone working machine with a feed mechanism.

U.S. Pat. No. 2,683,375 discloses a drilling machine drive.

U.S. Pat. No. 2,784,616 discloses a feed control attachment for hand tools.

U.S. Pat. No. 780,799 discloses a drill and advancement mechanism.

U.S. Pat. No. 246,938 discloses a rock drilling machine with an advancing feed mechanism.

Accordingly, it is an object of the present invention to provide useful alternatives to power feed machining.

It is a further object of the invention to provide a compact gear assembly as a means for pushing or pulling a reamer or boring cutter.

It is yet another object of the present invention to provide a differential positive feed mechanism which is externally driven by a drill motor for turning a cutter thereby allowing U-joints to access very tight areas which would not allow access by typical power equipment.

BRIEF SUMMARY OF THE INVENTION

A portable power feed tool for use in limited access areas. The differential positive feed mechanism includes a compact gear assembly that provides a means of pushing or pulling a reamer or boring cutter. The differential positive feed mechanism is externally driven by a drill motor to turn the cutter. The differential positive feed mechanism is clamped to the structure being machined as a transmission to supply feed to the cutter in limited access areas. A cutter such as a reamer is chucked to a drill motor, the speed being externally determined by the motor. On the forward end of the reamer is a threaded spindle with axial grooves running the length of the threaded spindle. The gear slips over the spindle and has dogs that engage the grooves only, allowing axial movement, but fixed radial engagement. A cluster gear train reduces to another gear which is threaded to the spindle. This threaded gear rotates at approximately 90% of the spindle speed, following for the micro advance of the cutter. Different thread pitches or gear ratios will offer different feed rates regardless of spindle RPM. The reamer or cutter may be positioned forward or aft of the threaded spindle thereby pushing or pulling the cutter.

BRIEF DESCRIPTION OF THE SEVERAL VIEWS OF THE DRAWING

FIG. 3 is an exploded elevation of internal parts.

FIG. 4 is a view of gear train and bearing.

FIG. 5 is a view of gear clusters.

DETAILED DESCRIPTION OF THE INVENTION

A reamer, as an example, is chucked to a drill motor. On the forward end of the reamer is a threaded spindle with axial grooves running the length of the threaded spindle. A gear slips over the threaded spindle, the gear having dogs which engage the grooves only, thereby allowing axial movement, and fixed radial engagement. A simple cluster gear train reduces to a further gear which is threaded to the spindle. The threaded gear rotates at approximately 90% of the spindle speed. As it does, it allows for the micro-advance of the cutter (spindle). Different thread pitches will offer different feed rates regardless of spindle RPM.

Figure 1:
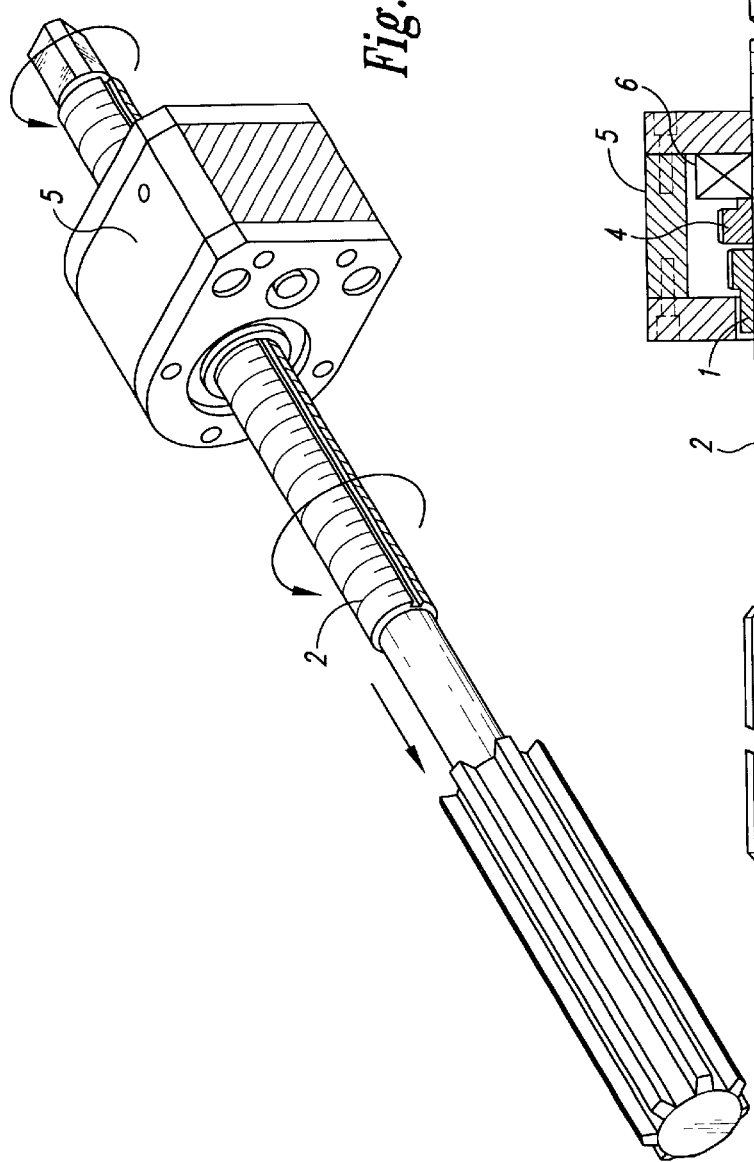
FIG. 1 is an elevation of assembled parts.
Figure 2:
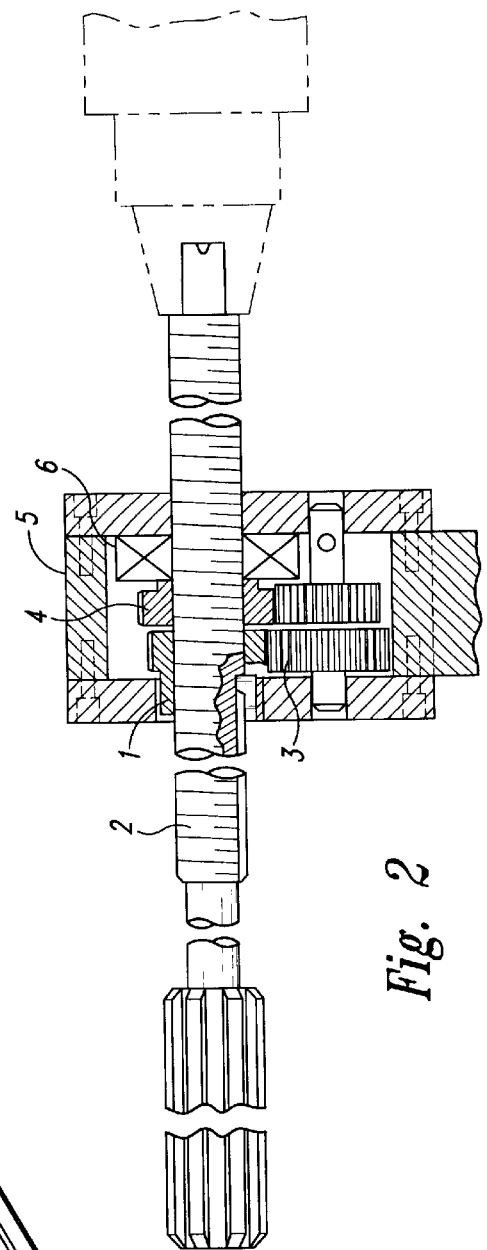
FIG. 2 is a section elevation of internal parts.
Figure 6:
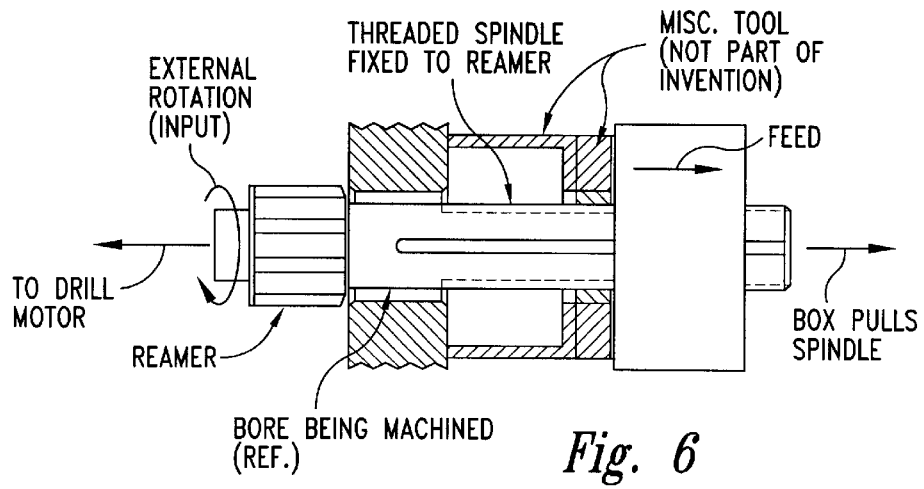
FIG. 6 is a longitudinal elevation with parts in section.
Figure 7A:
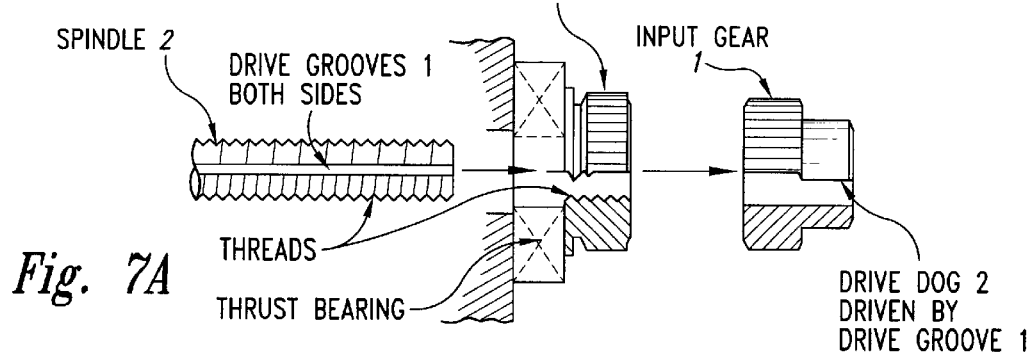
FIG. 7A is an exploded longitudinal elevation with parts in section.
Figure 7B:
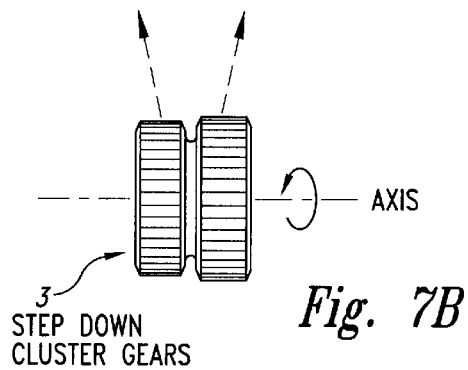
FIG. 7B is a fragmentary elevation of parts seen in FIG. 7A.

The hereinafter described differential positive feed mechanism shown in FIGS. 1–5 (with legends added for indication of relative motion of parts) is coupled in-line or axially with any standard drill, reamer or single point cutter. The differential positive feed mechanism will positively feed the cutter into a workpiece either by pushing or pulling, depending on the operator's setup. The differential positive feed mechanism is driven by an external rotary power source, drill, or by hand when no power equipment is available. Feed rates are determined by the spindle thread pitch 2, or by gear ratio. Simple feed changes are achieved by changing the THD pitch, the output gear 4 and spindle thread pitch 2.

The differential positive feed mechanism operates as follows: Threaded spindle 2 is rotated by external means. Threaded spindle 2 is grooved axially so that it engages dogs on input gear 1 and rotates only. Input gear is not restricted axially in its movement and is free to float threaded spindle 2. Input gear 1 engages and drives cluster gear 3 about a separate parallel shaft.

Cluster gear 3 engages output gear 4 which is threaded only to threaded spindle 2 via rotational reduction of gear 4 (which rotates at a speed less than input gear 1). The back driven gear feeds threaded spindle 2 in a forward direction. A thrust bearing 6 disposed about the central axis takes up the axial load of spindle 2. Threaded spindle 2 is coupled to the cutter.

Adding to the simplicity and usefulness of the hereinbefore described differential positive feed mechanism is a system feature wherein output gear 4 is the sole element that needs to be changed in order to change the feed rate of the tool. By changing the threads in output gear 4 (and matching spindle) the feed of the tool is effectively altered. This change within housing 5 surrounding the central axis takes an operator about 30 seconds in the above-described preferred embodiment and is very desirable in portable machining.

The preceding and further advantages will appear to those skilled in the art upon a reading of the foregoing specification.

While a preferred embodiment of the invention has been illustrated and described, variations will be apparent to those skilled in the art. Accordingly, the invention is not to be limited to the specific embodiment illustrated and described, and the true scope of the invention is to be determined by reference to the following claims.

What is claimed is:

1. In combination in the method of changing the feed rate of a tool having a drill motor driven differential positive feed mechanism including a threaded output gear (4) and matching spindle (2) within an open housing surrounding the control axis of the tool, the method including the step of:

clamping the differential positive feed mechanism to a structure being machined;

changing the threads in the output gear (4) and matching spindle (2) within the open housing (5) within a period of about 30 seconds; and, wherein changing the thread pitches provide different feed rates independent of spindle r.p.m.

* * * * *